Sept. 8, 1936.　　　　　G. ROÈS　　　　　2,053,634
AUTOMATIC STARTER FOR MOTORS
Filed Dec. 13, 1932　　　2 Sheets-Sheet 1

Sept. 8, 1936.　　　　　G. ROÈS　　　　　2,053,634
AUTOMATIC STARTER FOR MOTORS
Filed Dec. 13, 1932　　　2 Sheets-Sheet 2

Patented Sept. 8, 1936

2,053,634

UNITED STATES PATENT OFFICE 2,053,634

AUTOMATIC STARTER FOR MOTORS

Georges Roès, Paris, France

Application December 13, 1932, Serial No. 647,035
In France December 31, 1931

2 Claims. (Cl. 192—48)

The object of the present invention is a device for the automatic starting-up of motors; it applies more particularly to the automatic starting-up of the engines of motorcycles although it is applicable in other similar cases, for instance to automobile vehicles provided with free-wheels.

In a motorcycle such as those at present in use, when it is desired to start up the engine, the rear wheel is caused to turn by actuating the pedals, said rear wheel driving the engine through belting or a chain, said engine thus being started-up. But it will be appreciated the fact of actuating the pedals in order to drive the engine entails the expenditure of a fairly large amount of energy on the part of the user since it is necessary to propel the weight of the whole machine and at the same time to overcome the resistance opposed by the engine; in order to diminish this resistance it is customary to suppress compression by pressing on the decompressor; the fact remains nevertheless that the total resistance to be overcome in order to propel the machine and to drive the engine is still very great and may frequently exceed the limit of the effort certain users are capable of exerting.

On the other hand when for any reason it is desired to wheel the motorcycle along by hand the same comparatively high resistance will be encountered.

The device which forms the subject matter of the present invention makes it possible to remedy these drawbacks and to make cycles provided with engines as easy to handle as the bicycles themselves, said device also enabling the user to start-up and stop his engine each time and as frequently as he wishes.

The automatic starting-up device is essentially characterized by the combination, on the crankshaft of the engine, of a free-wheel mechanism and a suitable clutch device.

A form of embodiment of the invention, as applied to the engine of a motorcycle has been shown in the attached drawings in diagram form and merely as an example.

Figure 1:
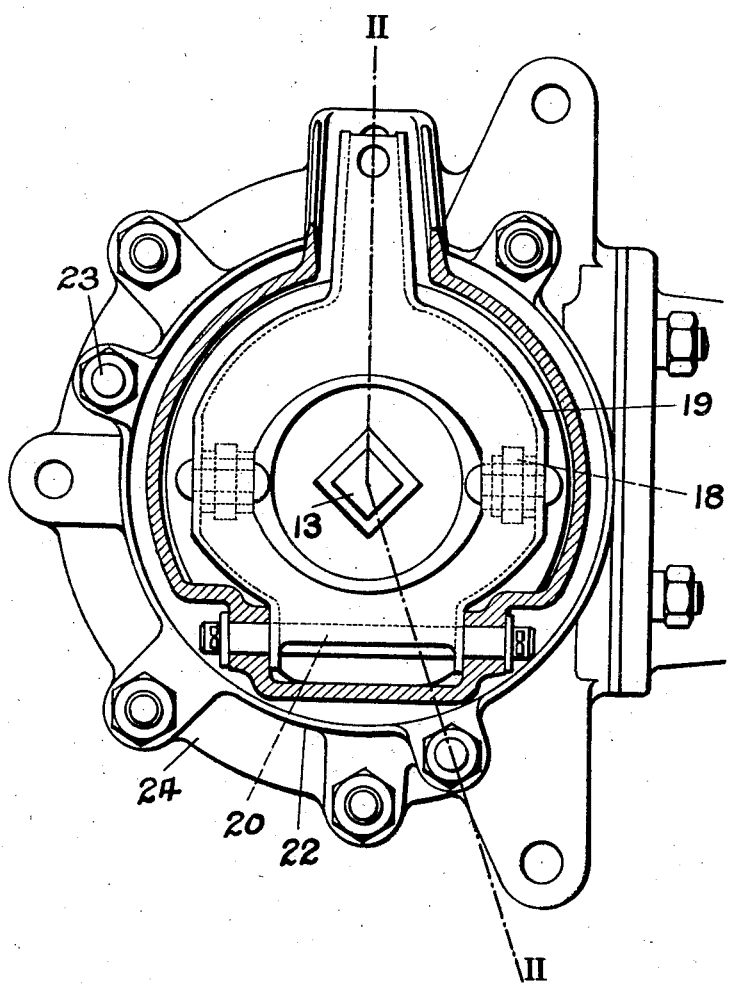
Figure 1 is an end view in elevation in part section of a device set up according to the invention.
Figure 2:
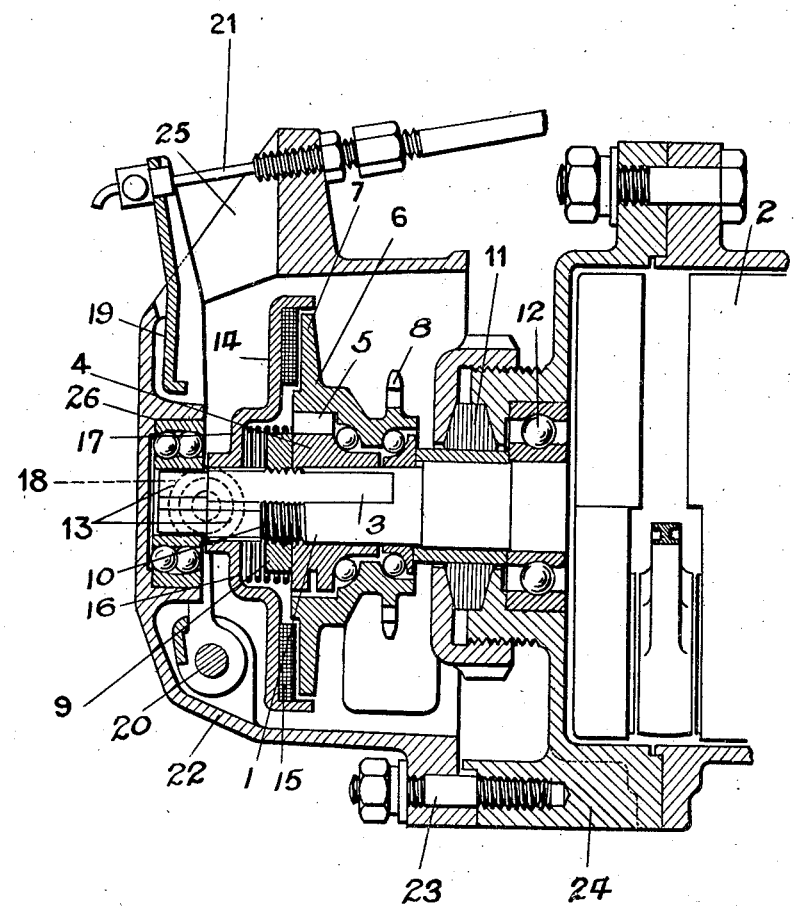
Figure 2 is a section taken on line II—II of Figure 1.

As is shown in the drawings, on the extremity 1 of crankshaft 2 is fixed, by any suitable means (for instance by means of two flats 3 of shaft 1), hub 4 of a free-wheel clutch 5 the outer rim 6 of which is integral with a clutch disc 7 and with driving sprocket wheel 8 connected to the rear wheel of the cycle (through a chain for instance); aforesaid hub of the free-wheel may be held in position by a nut 9 screwing onto a threaded portion 10 of shaft 1, said nut preventing any longitudinal movement of hub 4; said nut 9 also retains the central ring of stuffing box 11 and ball bearing 12 of crankshaft 1.

On said shaft 1 is mounted (for instance on a square portion 13 of shaft 1) a second clutch disc 14 provided with a suitable lining 15; said disc 14, which is free to move along shaft 1, constantly tends to be thrust out of contact with disc 7 owing to the action of a spring 16; disc 14 may be provided with a projecting portion 17 serving as a housing for the spring.

Rollers 18 mounted on a part 19 which is capable of oscillating about a fixed axis 20 bear against the outer surface of disc 14. The upper portion of part 19 is connected, by any suitable means, to an operating means (a Bowden cable 21 for instance) which makes it possible, by manipulation, to determine the oscillation of part 19 in order to bring disc 14 into engagement with disc 7.

The whole assembly is positioned within a housing 22 bolted at 23 to housing 24 of the engine. Housing 22 is provided with an opening 25 which allows of the oscillation of part 19 which passes through said opening and it is preferably provided with a ball bearing 26 for the extremity of shaft 1 which also serves as a thrust bearing for disc 14.

It will be seen that, in order to start-up the engine, it will be sufficient to actuate the pedals as in the case of an ordinary bicycle and without more effort (since the engine is not being driven as the free-wheel mechanism 5 is acting as a free wheel) and, when the machine has gained sufficient impetus it will suffice to press on the handle controlling Bowden wire 21 (which will cause the two discs 14 and 7 to come into engagement thus causing the rotation of crankshaft 1 on which disc 14 is mounted) to utilize this impetus for the starting-up of the engine. When the rotational speed of the engine has reached a point where it exceeds the rotational speed of sprocket wheel 8 and consequently of outer rim 6 of the free-wheel the handle which controls cable 21 can be released; the engine will drive sprocket wheel 8 through the mechanism of free-wheel clutch 5.

In the same way, when travelling on a down grade, it is possible to let the engine idle or even to stop it completely in order to economize fuel. Before reaching the bottom of the slope the impetus of the machine will be used to start-up the engine; to effect this it will suffice to actuate the handle which controls Bowden cable 21.

It should also be noted that if, for any reason, it is necessary to wheel the motorcycle by hand this can be done without any more difficulty or the expenditure of any greater effort than in the case of an ordinary bicycle since, owing to the free-wheel clutch 5 the engine will not be driven and its resistance will not have to be overcome.

Finally, on a dangerous down grade, the fact of bringing the two discs 7 and 14 into contact will constitute a brake cancelling the effect of the free-wheel clutch.

The driving facilities offered by an engine propelled cycle fitted with the device which forms the subject matter of the present invention will therefore be evident.

It is evident that the device described and illustrated is merely given as an example of an embodiment and that numerous modifications may be made to it and that the invention may be embodied in other forms within the scope of the following claims.

Finally it is evident, although the invention has been described in its application to a cycle provided with an engine, that it could be applied in any similar case for the starting-up of an engine by the impetus stored up by the machine said engine may be called upon to propel; for instance the invention might very well be applied in motor vehicles provided with free-wheels.

What I claim is:

1. A device for starting motor vehicle engines by means of the momentum of the moving vehicle comprising a free wheel mechanism mounted upon the crank shaft of the engine so as to enable the vehicle to be driven without actuating the engine, a clutch mechanism, one of the elements of said clutch being fixed to said free wheel mechanism and the other element of said clutch being slidingly and non-rotatively mounted upon the crank shaft of the engine.

2. A starting device for motor vehicle engines actuated by the momentum of the moving vehicle comprising a free wheel mechanism upon the crank shaft of the engine, a clutch mechanism having one element thereof integral with said free wheel mechanism, the second element of said clutch being in driving engagement with the crank shaft of the engine and means normally holding said clutch elements in spaced relation.

GEORGES ROËS.